Figure 1:
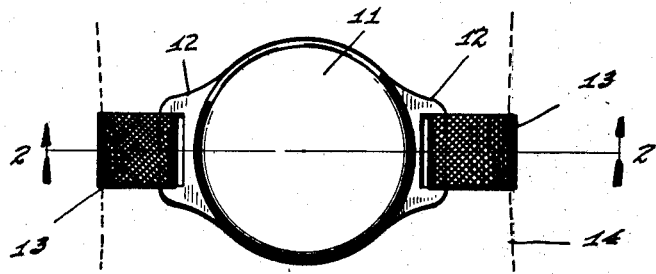

Inventor
KARL LARK-HOROVITZ,

Patented Dec. 26, 1933

1,941,173

UNITED STATES PATENT OFFICE 1,941,173

PROCESS AND DEVICE FOR COOLING THE ANIMAL BODY

Karl Lark-Horovitz, La Fayette, Ind., assignor to Purdue Research Foundation, West La Fayette, Ind., a corporation of Indiana Application November 21, 1931
Serial No. 576,469

3 Claims. (Cl. 128—254)

It is the object of my invention to provide a simple and convenient process and device by which the human body may be kept cool in the face of conditions, external or internal, which tend to heat it.

When the human body is subjected to temperatures which approach or exceed the normal blood temperature of 98.6° F., the natural cooling mechanism of the body by the evaporation of perspiration is often wholly insufficient to maintain comfort; and the perspiration itself is often most disagreeable.

It has long been known that the uncomfortable subjective effect of too great heat, whether due to external heat or to internal fever, can be lessened and often obviated by cooling the blood-circulating system, as by putting ice or cold water on portions of the body where the arteries come close to the surface, as on the wrist. But such application of ice or of cold water is troublesome and often cumbersome, in part on account of the necessity of taking care of the liquid water, and in part on account of the almost inevitable wetting of garments.

According to my invention, I effectively and simply cool the body with no such troubles, by applying to the body surface, desirably over a subjacent artery, a cooling device which is kept cool by a material which sublimes at a temperature below the normal temperature of the body. The most desirable substance which I know for this is the so-called "dry ice", or solid carbon dioxide, which sublimes, or passes directly from the solid phase to the gaseous phase, at 80° below zero C. No refuse of the cooling, such as water in the liquid state, remains as a source of attention and potential discomfort.

Dry ice is so cold that if allowed to sublime in direct contact with the skin it causes so-called "burns", which are most painful. Therefore, according to my invention the dry ice is held away from the skin, with an intervening layer of gas which it keeps cold, so that the disagreeable and dangerous "burns" which it may cause are avoided.

In carrying out my invention, I put the dry ice in a suitable container, which may be quite small and inconspicuous on account of the low temperature of the dry ice; and clamp this container upon the body surface, desirably at a point where an artery lies beneath. The container is such that diffusion from it of the gaseous carbon dioxide produced as the dry ice sublimes is possible. Most conveniently, the container and its clamping means are about the size and shape of a wrist watch, to be held in place on the wrist by a suitable strap, over the radial artery; although it may be placed in any desired body-location. The sublimation of the dry ice in the container maintains a cool spot at that wrist, and extracts heat from the blood flowing in the subjacent artery. This is found to produce a cooling of the entire body, as the cooled blood circulates through the body, and is usually sufficient to make a person wholly comfortable even in the hottest weather.

The same cooling device and process may be used in the case of fever patients. The abnormally hot blood is cooled toward or to normal, without the discomfort and inconvenience of cooling with cold water or ice.

Figure 2:
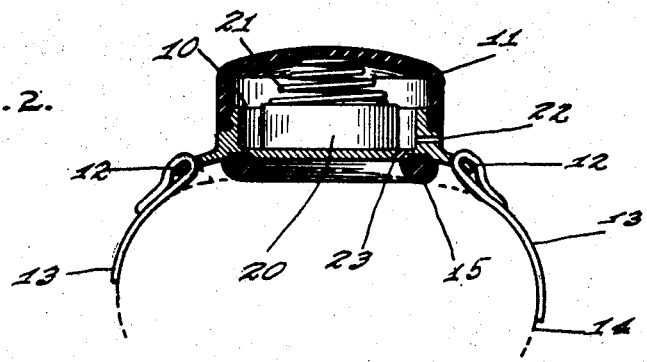

I have illustrated my invention in the accompanying drawing; Fig. 1 is a plan view, somewhat enlarged, showing my device in place on a wrist; Fig. 2 is a section on the line 2—2 of Fig. 1, showing a construction in which the lower part of the container is metal; and Fig. 3 is a view similar to Fig. 2, but showing a modification in which the whole body of the container is of some heat-insulating material.

In the structure shown in Fig. 2, the container is formed of a lower part 10, of metal, and a cap 11 which is removably mounted on the lower part, conveniently with a screw-joint. The cap 11 may be of some heat-insulating material, such as wood-fibre or bakelite. The lower part 10 of the receptacle is provided with a pair of ears 12 for receiving the ends of the strap 13 by which the device is attached to the wrist 14 (or other body-part with a subjacent artery) in the manner of a wrist watch. The metal is desirably held out of contact with the skin, as by having on its under face a spacing ring 15 of heat-insulating material which engages the skin and lifts the metal from it.

The spacing ring encloses a layer of gas which absorbs heat from the wrist and is kept cool by the sublimation of the dry ice 20 which is put in the container 12—13. The dry ice 20 may be pressed down against the lower part 10 of the container by a compression spring 21 carried by the cap 11. The gas formed by the sublimation of the dry ice is permitted to escape and diffuse, which it may do through pores in the material of the container and/or cap and/or through the joint between the container proper and its cap, but for which special vent openings are desirably provided. Such vent openings may be in any convenient location, but desirably there is one vent opening 22 which leads through the top or side of the container to the atmosphere, and another vent opening 23 which leads through the bottom of the container to the space enclosed within the ring 15 to permit some of the cold gaseous carbon dioxide to pass down into that space which is in contact with the skin. In this way, as well as by conduction through the metal of the container-part 10, the layer of gas that lies against the skin within the ring 15 is kept sufficiently cold to produce effective cooling of the blood in the subjacent artery. When a change of dry ice has sublimed, a new change may readily be put in the container.

Figure 3:
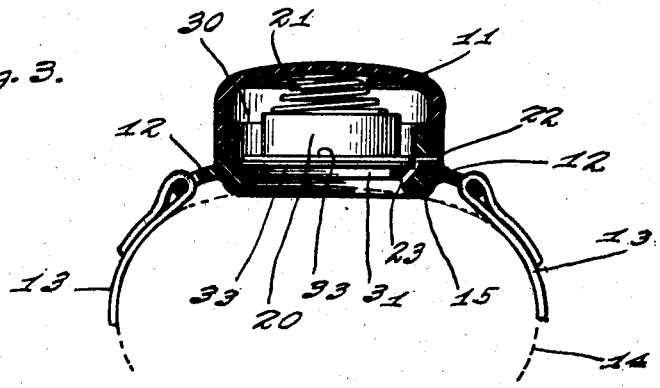

In the arrangement shown in Fig. 3, the cap 11 and spring 21 may be of the same construction already described, but the lower container-part 30 is also formed of heat-insulating material. In this case it has ears 12 as before, for co-operating with the wrist-strap 13; and it has the spacing ring 15 formed integral with it. The bottom of the container-part 30 has a large opening 31, over which is placed a metal disk 32 on which the dry ice 20 rests. If desired, in order to provide greater protection against contact of the metal 32 with the skin, a disk of waxed paper 33 or other heat-insulating material may underlie the metal disk 32. As in the arrangement shown in Fig. 2, so in the arrangement shown in Fig. 3 there are desirably provided vents 22 and 23.

I claim as my invention:

1. A device for cooling the animal body, comprising a container having a removable cap, a spring mounted within said cap for pressing against the bottom of the container charges of a sublimable material which sublimes at less than body temperature, and an attaching strap associated with said container for attaching it to a body-part such as the wrist, said container being provided with a heat-insulating spacing ring by which its central part is held away from the skin enclosed within the spacing ring.

2. A device for cooling the animal body, comprising a container having a removable cap the removal of which permits the insertion into the container of a charge of solid carbon dioxide, and an attaching strap associated with said container for attaching it to a body-part such as the wrist, said container being provided with a heat-insulating spacing ring by which its central part is held away from the skin enclosed within the spacing ring.

3. A device for cooling the animal body, comprising a container openable to receive a charge of solid carbon dioxide, and means for attaching such container to a body-part; said container being provided with a heat-insulating spacing ring by which its central part is held away from the skin enclosed within the spacing ring, and also with an opening for permitting gaseous carbon dioxide produced by the subliming of the solid carbon dioxide within the container to pass from the container into the space between the container and the skin and within the spacing ring.

KARL LARK-HOROVITZ.